(12) United States Patent
Merriam

(10) Patent No.: US 7,386,054 B2
(45) Date of Patent: Jun. 10, 2008

(54) APPARATUS AND METHOD FOR MULTI-CHANNEL COMMUNICATIONS

(75) Inventor: John Merriam, Boxford, MA (US)

(73) Assignee: Agere Systems Inc., Allentown, PA (US)

( * ) Notice: Subject to any disclaimer, the term of this patent is extended or adjusted under 35 U.S.C. 154(b) by 291 days.

(21) Appl. No.: 11/208,073

(22) Filed: Aug. 19, 2005

(65) Prior Publication Data

US 2006/0007959 A1 Jan. 12, 2006

Related U.S. Application Data

(63) Continuation of application No. 09/695,647, filed on Oct. 24, 2000, now Pat. No. 6,975,685.

(51) Int. Cl.
*H04L 27/00* (2006.01)
(52) U.S. Cl. .................................... 375/259
(58) Field of Classification Search ........ 375/232–233, 375/260, 285, 324, 340, 346, 350; 370/329, 370/347, 327
See application file for complete search history.

(56) References Cited

U.S. PATENT DOCUMENTS 4,852,090 A * 7/1989 Borth ......................... 370/347
6,240,140 B1 * 5/2001 Lindbergh et al. .......... 375/260
6,735,255 B1 * 5/2004 Smart et al. ................ 375/260

* cited by examiner

*Primary Examiner*—Khanh C. Tran
(74) *Attorney, Agent, or Firm*—Priest & Goldstein, PLLC

(57) ABSTRACT

A communications system employs digitally modulated signals operating in a band of frequencies that is divided into two or more non-overlapping channels, with each channel occupying no more than a predetermined maximum frequency band. A receiver system includes a front end processor and a receiver, the front end processor being configured to receive a data stream that represents the entire frequency band sampled at a rate of at least twice the highest frequency within the frequency band. The front end processor operates produces an output data stream that represents each channel within the band, with samples for each channel within the band at a rate that is a multiple of the symbol rate for the given channel. A receiver operates on this data stream sequencing through the multiple channels to phase correct, time correct, and equalize the data stream for all the constituent channels. The communications system may be a cable television system that provides for upstream communications through a coaxial cable from a subscriber to a "headend". Although such a system may be a conventional system whereby a single headend may service tens of thousands of subscribers and adhere to the DOCSIS standard for upstream communications, the system may also employ a much more widely distributed array of "mini-headends" that service an order magnitude fewer subscribers and that form the boundary between coaxial and optical fiber communications.

20 Claims, 12 Drawing Sheets

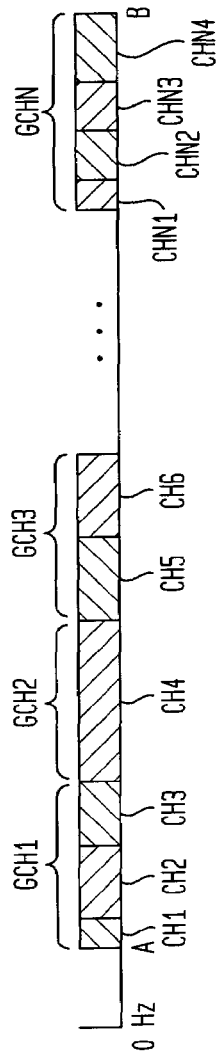
FIG. 8
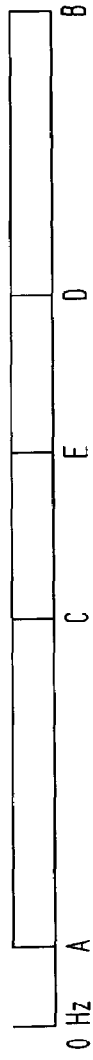
FIG. 9A
FIG. 9B
FIG. 9C
FIG. 9D
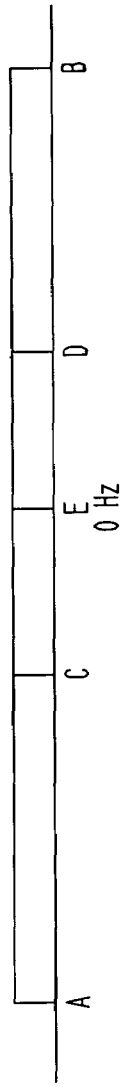
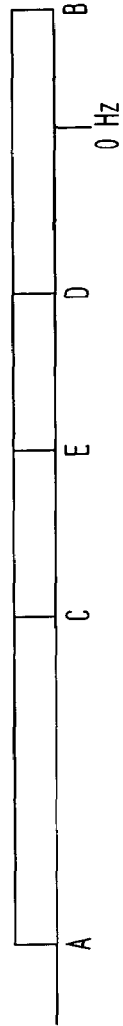
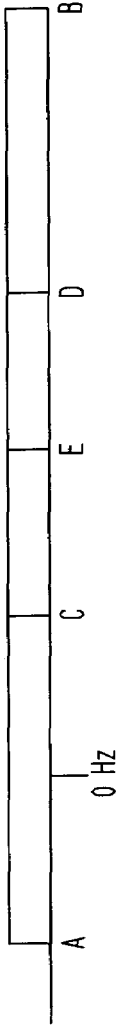

APPARATUS AND METHOD FOR MULTI-CHANNEL COMMUNICATIONS

CROSS-REFERENCE TO RELATED APPLICATIONS

Patent applications entitled "APPARATUS AND METHOD FOR MULTI-CHANNEL RECEIVER" U.S. application Ser. No. 09/695,536 and "APPARATUS AND METHOD FOR MULTI-CHANNEL RECEIVER FRONT END" U.S. application Ser. No. 09/695,645, both filed on Oct. 24, 2000, having the same inventor and assigned to the same assignee as this application are hereby incorporated by reference. This application is a continuation of U.S. application Ser. No. 09/695,647 filed on Oct. 24, 2000 now U.S. Pat. No. 6,975,685.

FIELD OF THE INVENTION

The invention relates to the demodulation of digital signals and, in particular, to the demodulation of multi-channel signals.

BACKGROUND OF THE INVENTION

In some telecommunications applications a relatively broad frequency band may be divided into channels that may be assigned in such a way as to avoid interference within the transmission medium. For example, the Data over Cable Service Interface Specifications (DOCSIS) allot the band between 5 and 42 MHz for "upstream communications from a cable subscriber to a cable television (CATV) "head end". This frequency band may be used for a variety of purposes, including, through use of a cable modem, communications between a subscriber's computer and the Internet, communications to a CATV service provider, and digitized voice transmissions, for example. This 37 MHz upstream band may be divided into non-overlapping channels each having a bandwidth of approximately 3.2 MHz, 1.6 MHz, 0.8 MHz, 0.4 MHz, or 0.2 MHz. Each CATV head end may service as many as 20,000 subscribers and, consequently, with each cable acting as an antenna, and each cable connection "leaking" signal into the cable, the upstream band may be cluttered with interference. The upstream channels may be selected to avoid such interference, with, for example 0.2 MHz channels assigned with center frequencies set to fit in the interstices between interfering signals to thereby avoid interference. Channels having broader bandwidths might be assigned to frequency ranges of relatively low levels of interference.

Centralized headend and distributed headend communications systems are known and discussed, for example, in U.S. Pat. No. 5,841,468 entitled, SYSTEM AND METHOD FOR ROUTING DATA MESSAGES THROUGH A CABLE TRANSMISSION SYSTEM, issued to Wright, U.S. Pat. No. 6,100,883, entitled, HOME INTERFACE CONTROLLER FOR PROVIDING INTERACTIVE CABLE TELEVISION, issued to Hoarty, and U.S. Pat. No. 5,999,970, entitled, ACCESS SYSTEM AND METHOD FOR PROVIDING INTERACTIVE ACCESS TO AN INFORMATION SOURCE THROUGH A TELEVISION DISTRIBUTION SYSTEM, issued to Krisbergh et al, all of which are hereby incorporated by reference.

Upstream receivers typically devote a circuit board of electronics to between 4 and 8 channels, and, within each circuit board, an analog to digital converter (ADC) to each channel. If any of those channels are unused, or are used to process narrow channels, the associated ADC and ancillary circuitry is underutilized. Such underutilization may be manifested, not only in terms of capital outlays, but in the recurring costs associated with increased energy expenses, increased cooling requirements, and requirements for greater space to house the telecommunications equipment.

It would therefore be highly desirable to provide an efficient apparatus and method for receiving signals, such as DOCSIS upstream signals, that maximizes the use of hardware resources while at the same time remaining flexible.

SUMMARY

A communications system in accordance with the principles of the present invention employs digitally modulated signals operating in a band of frequencies that is divided into two or more non-overlapping channels, with each channel occupying no more than a predetermined maximum frequency band. In one aspect of the invention a receiver system includes a front end processor and a receiver, the front end processor being configured to receive a data stream that represents the entire frequency band sampled at a rate of at least twice the highest frequency within the frequency band. The front end processor operates on this input data stream to produce an output data stream that represents each channel within the band, with samples for each channel within the band at a rate that is a multiple of the symbol rate for the given channel. A receiver is configured to operate on this data stream (that is, a data stream representative of all the channels within the frequency band of interest, and having multiple samples for each symbol period of each channel), sequencing through the multiple channels to phase correct, time correct, and equalize the data stream for all the constituent channels. That is, rather than dedicating a different receiver to each channel, the receiver is synchronized with the data stream provided by the front-end processor and cycles through the data for each channel to equalize, phase- and time-correct the incoming signals.

In one aspect of the invention, the communications system may be a cable television system that provides for upstream communications through a coaxial cable from a subscriber to a "headend". Although such a system may be a conventional system whereby a single headend may service tens of thousands of subscribers and adhere to the DOCSIS standard for upstream communications, the system may also employ a much more widely distributed array of "mini-headends" that service an order magnitude fewer subscribers and that form the boundary between coaxial and optical fiber communications. Whether the system employs a centralized headend, or distributed mini-headends, receiver systems at the point of conversion between coaxial cable and optical fiber transmission, whether that be within a centralized headend or within a plurality of distributed headends, includes a receiver system that converts all channels within the upstream band to baseband, decimates each baseband channel signal to at least twice the symbol rate of the corresponding channel, and sequences through the multiple channels to phase correct, time correct, and equalize the data stream for all the constituent channels.

BRIEF DESCRIPTION OF THE DRAWINGS

The above and further features, aspects, and advantages of the invention will be apparent to those skilled in the art from the following detailed description, taken together with the accompanying drawings in which:

FIG. 8 is a frequency diagram depicting channel assignments in a communications system in accordance with the principles of the present invention;

FIGS. 9A through 9D are frequency diagrams that depict the shifting of frequency channels to baseband effected by a front end processor that may be used in a communications system in accordance with the principles of the present invention;

DETAILED DESCRIPTION

Figure 1:
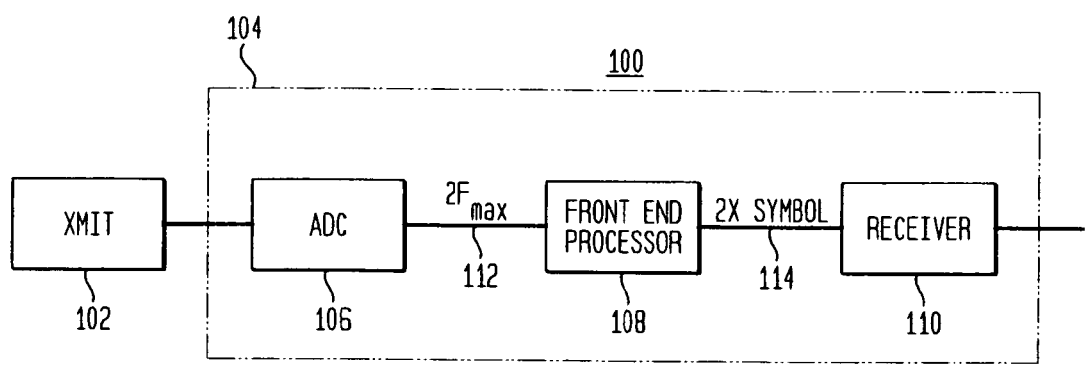
FIG. 1 is a conceptual block diagram of a communications system in accordance with the principles of the present invention.

The conceptual block diagram of FIG. 1 illustrates a communications system 100 in accordance with the principles of the present invention that employs digitally modulated signals operating in a band of frequencies that is divided into two or more non-overlapping channels, with each channel occupying no more than a predetermined maximum frequency band. In an illustrative embodiment, the system 100 includes a transmitter 102 and a receiver system 104. The transmitter 102 transmits digitally modulated signals operating in a band of frequencies that is divided into two or more non-overlapping channels, with each channel occupying no more than a predetermined maximum frequency band. The receiver system 104 may include an analog to digital converter (ADC) 106, a front end processor 108 and a back end processor, or receiver 110. The front end processor 108 may be configured to receive a data stream that represents the entire frequency band sampled at a rate that is at least twice the highest frequency within the frequency band. In an illustrative embodiment, a single ADC may be employed to sample the entire frequency band at this rate.

The front end processor 108 may operate on this input data stream 112 to produce an output data stream 114 that represents each channel within the band as decimated channel signals that have been down-converted to baseband at least twice the symbol rate of the given communications channel. In an illustrative embodiment, the receiver 110 is configured to operate on the output data stream 114, sequencing through the multiple channels to phase correct, time correct, and equalize the data stream 114 for all the constituent channels. That is, rather than dedicating a different receiver to each channel, the receiver 110 is synchronized with the data stream 114 provided by the front-end processor and cycles through the data for each channel to equalize, phase-correct and time-correct the output data stream 114.

Figure 2A:
FIGS. 2A through 2E are frequency diagrams that illustrate various divisions in a frequency band such as may be processed in a communications system in accordance with the principles of the present invention.
Figure 2B:
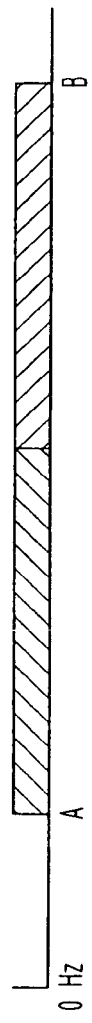
Figure 2C:
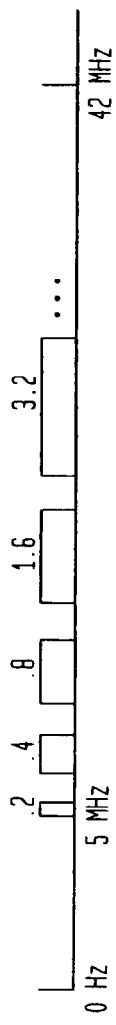
Figure 2D:
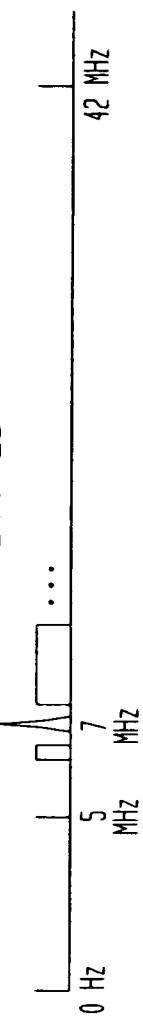
Figure 2E:
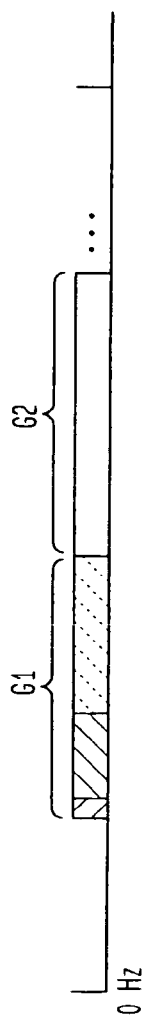

The digitally modulated signals employed by a communications system in accordance with the principles of the present invention may occupy a band of frequencies that stretch from a lower frequency bound A to an upper frequency bound B, as illustrated in the frequency diagram of FIG. 2A. In accordance with the principles of the present invention, this frequency band may be divided into two or more non-overlapping channels, as illustrated in the frequency diagram of FIG. 2B. In a data over cable service interface specification (DOCSIS) compliant embodiment, the lower A and upper B frequency bounds are 5 and 42 MHz, respectively and that band may be divided into non-overlapping channels of 0.2 MHz, 0.4 MHz, 0.8 MH2, 1.6 MHz, or 3.2 MHz. The center frequencies of these channels may be selected in a manner that avoids interference and may be chosen with complete flexibility, so long as the resulting channels are non-overlapping as generally illustrated in the frequency diagram of FIG. 2C. For example, in order to avoid interference at 7 MHz in a DOCSIS system, a 0.2 MHz channel may be centered at 6.8 MHz, and a 0.8 MHz channel may be centered at 7.6 MHz, as illustrated in the frequency diagram of FIG. 2D. In DOCSIS and other, non-DOCSIS compliant embodiments, a communications system in accordance with the principles of the present invention may employ a scheme whereby the frequency band from A to B organized into group channels G1, G2, etc., each of which includes one or more channels, is illustrated in the frequency diagram of FIG. 2E. In one aspect of the invention, the communications system 100 may be a cable television system, as illustrated in the conceptual block diagram of FIG. 3, that provides for upstream communications through one or more coaxial cables 300 from subscribers 302 to a "headend" 304 that includes a receiver system 104. Each of the subscribers 302 transmits information to the headend 304 using a transmitter (not shown) such as the transmitter 102 of FIG. 1.

In an illustrative embodiment, the system 310 is a DOCSIS compliant system in which each of the transmitters, as previously described, may transmit in assigned channels within the upstream frequency band from approximately 5 to 42 MHz. This band may be divided into channels 0.2 MHz, 0.4 MHz, 0.8 MHz, 1.6 MHz, or 3.2 MHz wide. In a DOCSIS-compliant embodiment of the system 100, such as system 310 illustrated in FIG. 3, there may be as many as 20,000 subscribers 302 serviced by a single headend 304. In addition to downstream signals provided by the headend to subscribers, which typically may fall within the 45 MHz to 860 MHz band, the subscribers 302 may transmit digital information to the headend 304 and, although such information was once limited to such things as 'pay per view' selections, more recently such information may include various forms of data communication in conjunction with the use of the Internet, or digitized voice traffic, for example. Each of the coaxial cables 300, in spite of a grounded shielding surface surrounding and coaxial with a center signal conductor, acts as an antenna that is capable of picking up electrical noise and interference and superimposing this unwanted signal on a desired signal. Each of numerous points of connection within the system (not shown) also permit the admission of noise and interference. In order to avoid such interference, subscribers may transmit information, on upstream channels selected to avoid such interference, as described in the discussion related to FIG. 2D.

Figure 4:
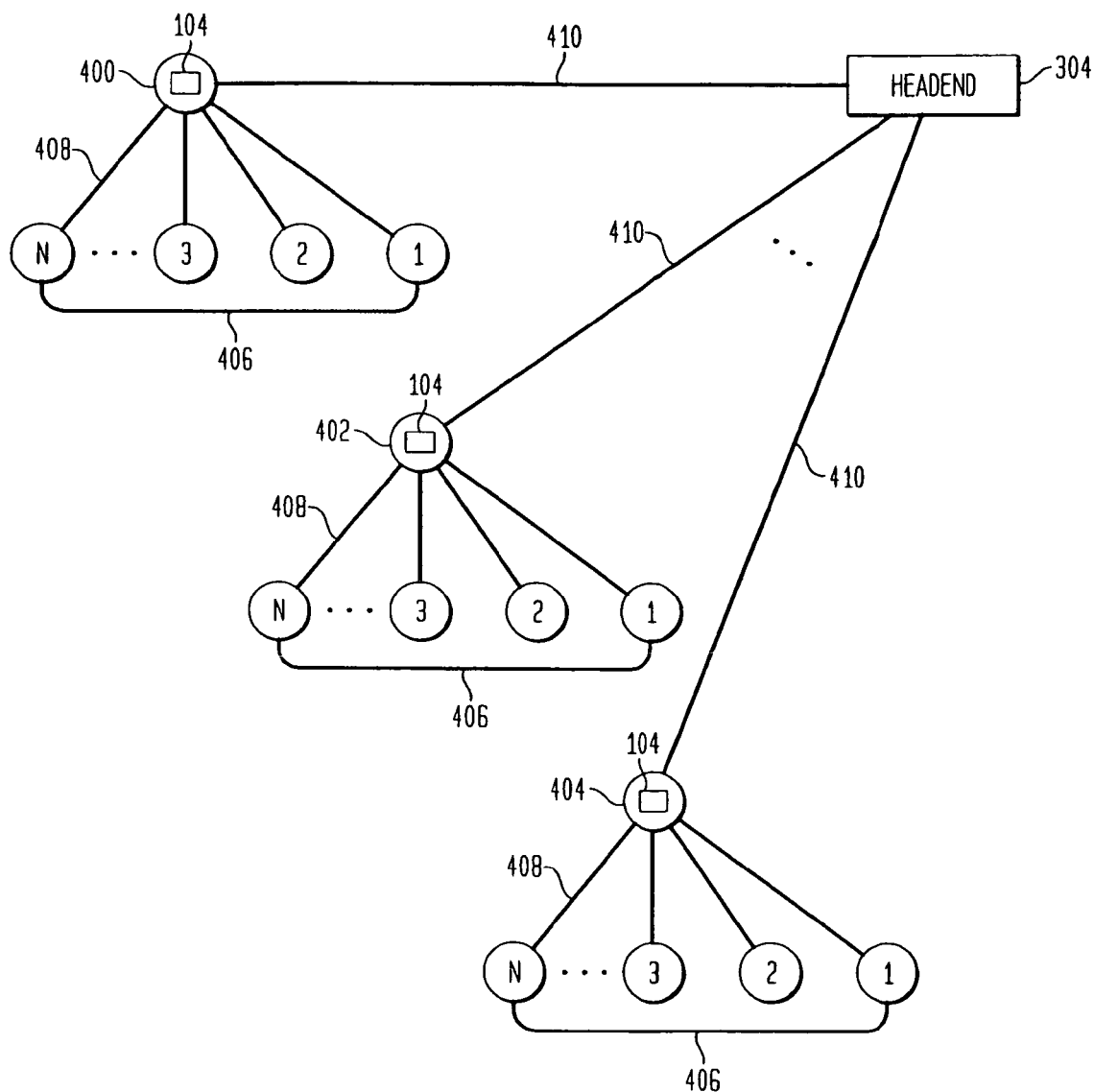
FIG. 4 is a conceptual block diagram of a distributed headend communications system in accordance with the principles of the present invention.

Although the system 100 may be organized in a manner whereby a single headend may service tens of thousands of subscribers and adhere to the DOCSIS standard for upstream communications, the system may also employ a distributed array of two or more "mini-headends" 400, 402, 404, as illustrated in the conceptual block diagram of FIG. 4. In this illustrative embodiment, each mini-headend services N or fewer subscribers 406, where N is no more than 500. The mini-headends, 400, 402, and 404 may be located in remote locations and that form the boundary between coaxial and optical fiber communications, with coaxial cables 408 forming the links between subscribers and mini-headends and optical fibers 410 forming the links between mini-headends and a headend 304. Whether the system employs a centralized headend, or distributed mini-headends, receiver systems at the point of conversion between coaxial cable and optical fiber transmission, whether that be within a centralized headend or within a plurality of distributed headends, includes a receiver system 104 which, as previously described, converts all channels within the upstream band to baseband, decimates each baseband channel signal to at least twice the symbol rate of the corresponding channel, and phase corrects, time corrects, and equalizes the data stream for all the constituent channels.

Figure 3:
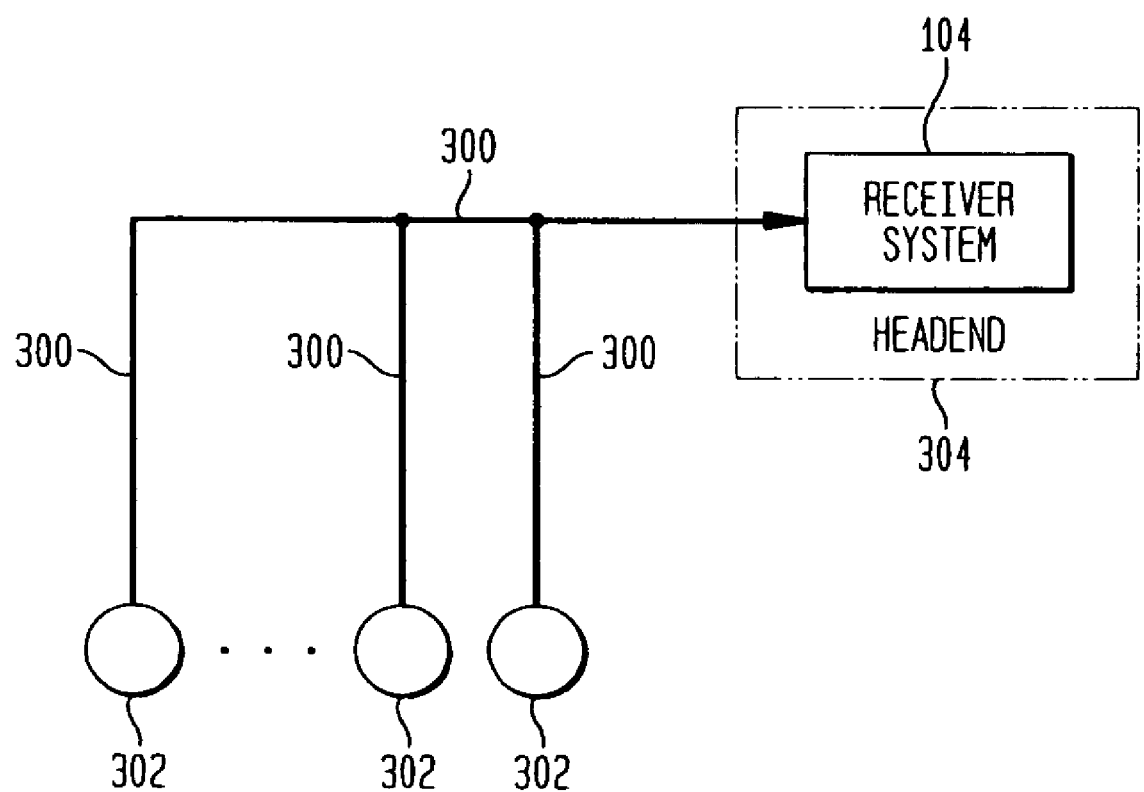
FIG. 3 is a conceptual block diagram of a centralized headend communications system in accordance with the principles of the present invention.

With each mini-headend 400, 402, and 404 serving a smaller group of subscribers, noise and interference on the cables 408 is substantially less than that on the cables 300 of FIG. 3. Furthermore, the reduced number of subscribers per mini-headend may facilitate assigning a narrow frequency band to each subscriber which significantly increases Quality of Service. Since the mini-headends 400, etc. may well be positioned in remote, neighborhood locations, the bulk, expense, and power consumption of each receiver system 104 should be minimized. As previously described, the front end of the receiver system 104 reduces the number of ADCs required, in comparison with conventional receivers and, as will be described, may afford further savings in energy, bulk, and capital outlays.

In accordance with the principles of the present invention a receiver system for use in a communications system that employs digitally modulated signals operating in a band of frequencies that is divided into two or more non-overlapping channels, with each channel occupying no more than a predetermined maximum frequency band, accepts data stream of the entire band sampled at a rate of at least twice the frequency of the highest frequency in the band and converts, either in parallel or iteratively, the component channels to baseband signals sampled at least twice the symbol rate of each of the channels. A single analog to digital converter may be employed to produce the sampled whole-band data stream operated upon by the receiver system's front end processor.

Figure 5:
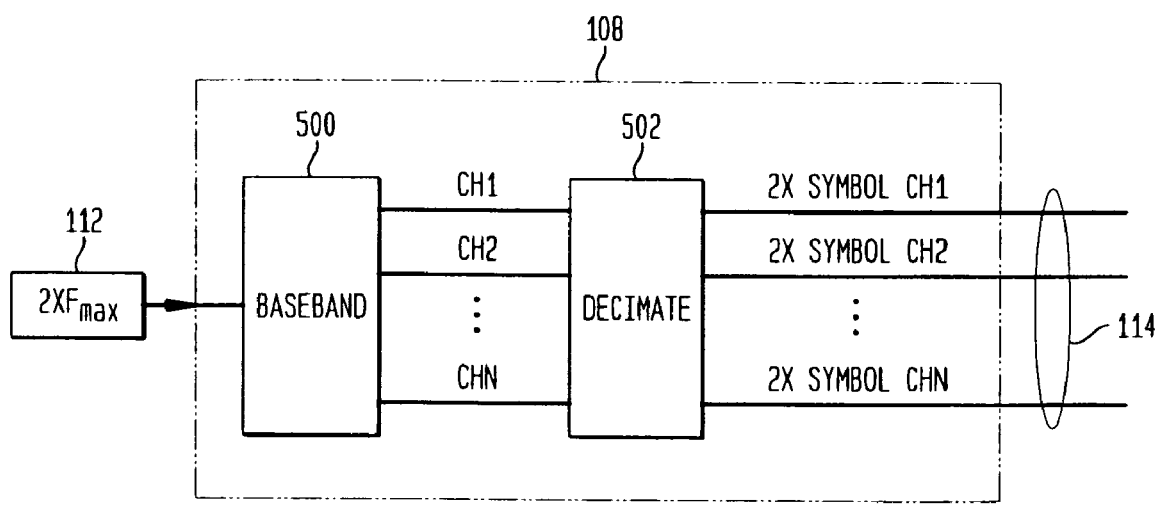
FIG. 5 is a conceptual block diagram of a front end processor that may be used in a communications system in accordance with the principles of the present invention.

In accordance with the principles of the invention a front end processor 108 may be employed to accept a data stream 112 that represents the entire band of digitally modulated signals that comprise two or more non-overlapping channels, with each channel occupying no more than a predetermined maximum frequency sub-band, the entire band having been sampled at least twice the frequency of the highest frequency within the band. As depicted in the conceptual block diagram of FIG. 5, the front end processor 108 includes a converter 500 that converts the component channels to baseband, and produces an output stream of baseband channel data for each channel CH1, CH2, CHN. The baseband channel data CH1, CH2, CHN is passed to a decimator 502 which yields component baseband channel data sampled at least twice the symbol rate of each of the channels. As will be described in greater detail in the discussion related to the following Figures, the baseband conversion and decimation may take place in parallel, with, essentially, one step for each operation, or it may be performed in a more iterative fashion. In either case, the front end operates upon data for all the signals within the band of interest to produce an output baseband data stream 114 at twice the symbol rate of each of the band's constituent channels. The data stream 114 may be a single, multiplexed, data stream or the data may be split into streams for each of the constituent channels.

Figure 6:
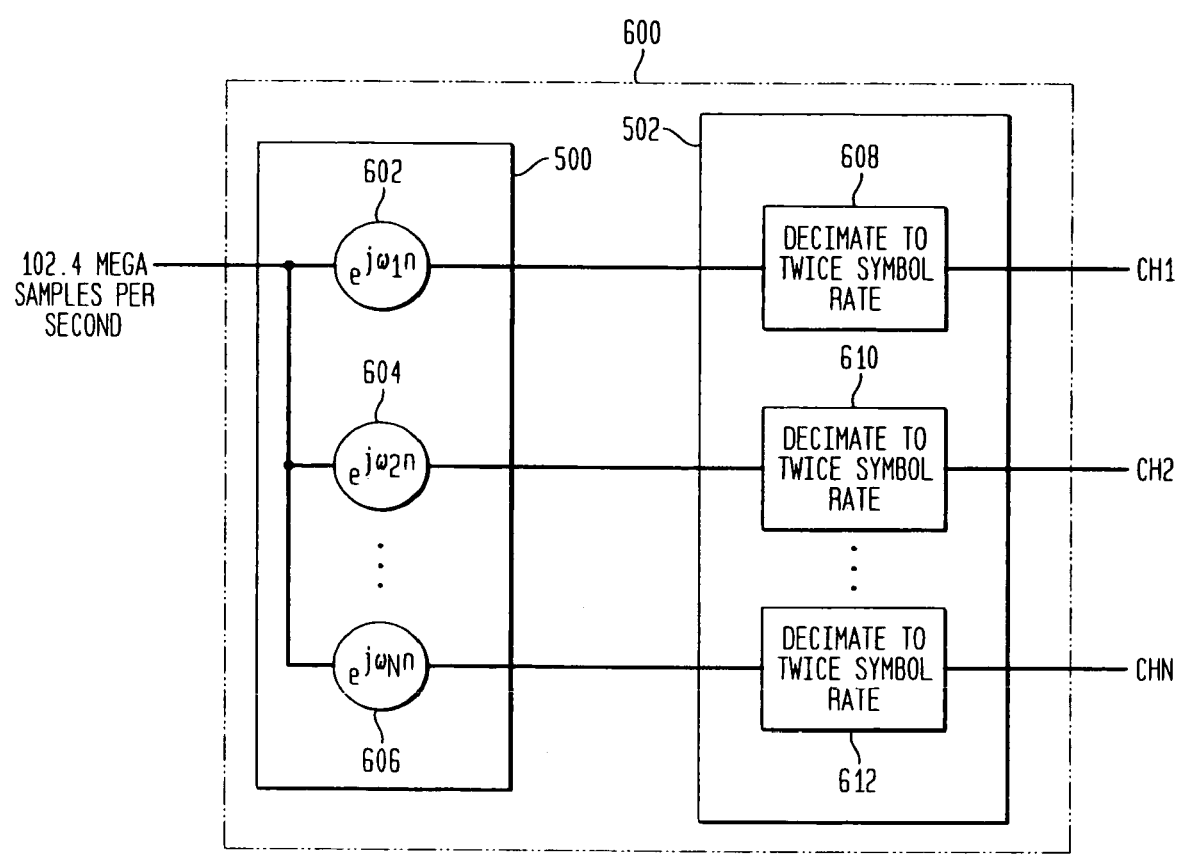
FIG. 6 is a conceptual block diagram of one embodiment of a front end processor that may be used a communications system in accordance with the principles of the present invention.

In the illustrative DOCSIS-compatible embodiment depicted in the conceptual block diagram of FIG. 6 a front end processor 600 processes signals sampled at 102.4 mega-samples per second by demodulating and filtering all the channels within the upstream band in parallel. The front end processor 600 is a specific example of the previously described front end processor 108 and may be configured to operate on the entire upstream band converted to a single digital bit stream, such as may be accomplished by a single ADC sampling at a rate of at least twice the highest frequency in the band. Since, in a DOCSIS upstream signaling system the digitally modulated signals fall within non-overlapping upstream channels that are assigned within a 5 to 42 MHz band, the sample rate of 102.4 mega-samples per second in this illustrative embodiment is more than sufficient to meet the Nyquist criterion. Each non-overlapping channel has a bandwidth of approximately 3.2 MHz, 1.6 MHz, 0.8 MHz, 0.4 MHz, or 0.2 MHz and the upstream band may include any mix of such channels, centered on any frequency within the band, so long as the channels are non-overlapping. Each such channel carries digitally modulated information that may be in the form of pulse amplitude modulated (PAM), quadrature amplitude modulated (QAM), or other digitally modulated signaling schemes.

Figure 12:
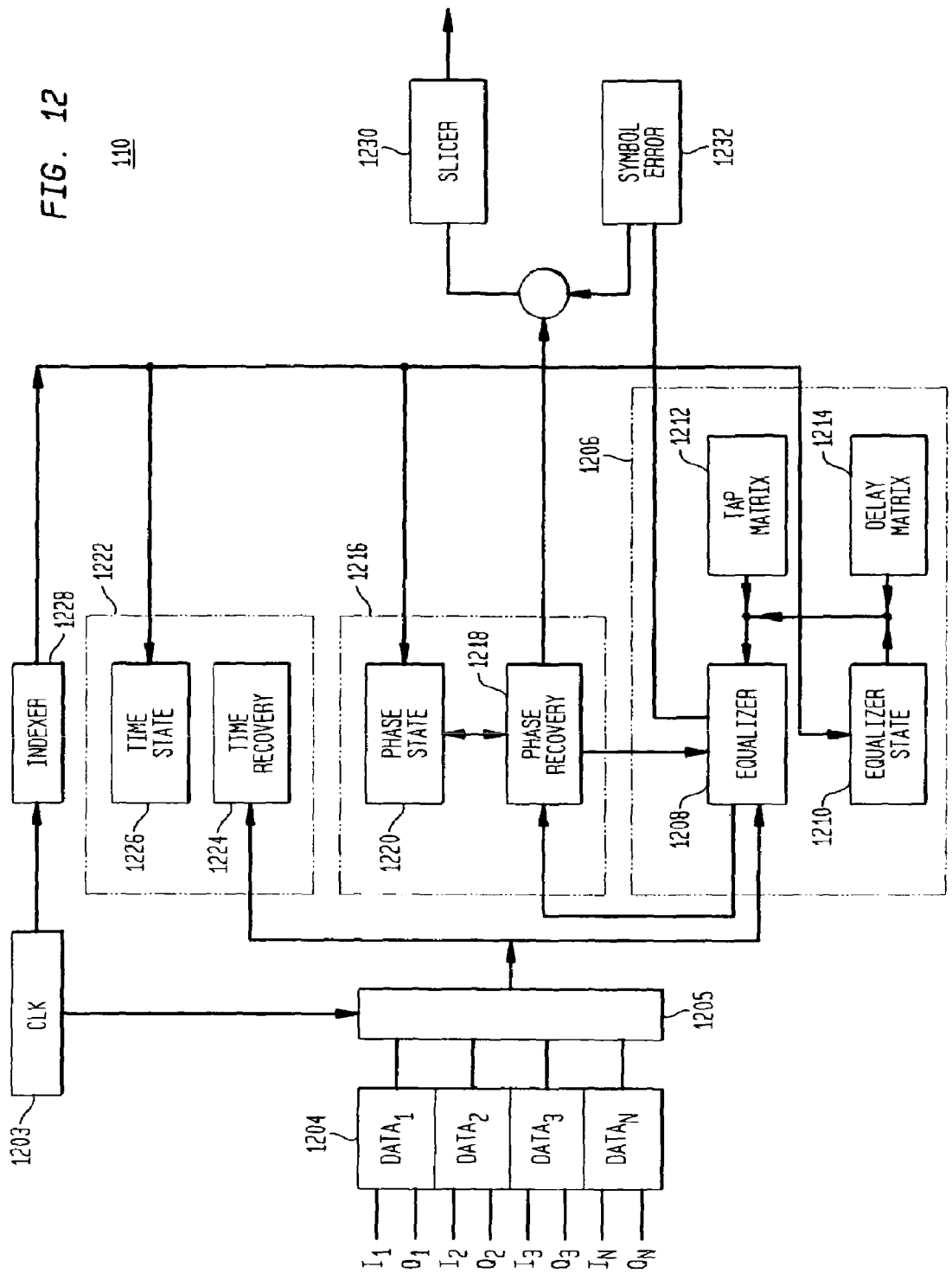
FIG. 12 is a conceptual block diagram of a receiver that may be employed in a communications system in accordance with the principles of the present invention.
Figure 13:
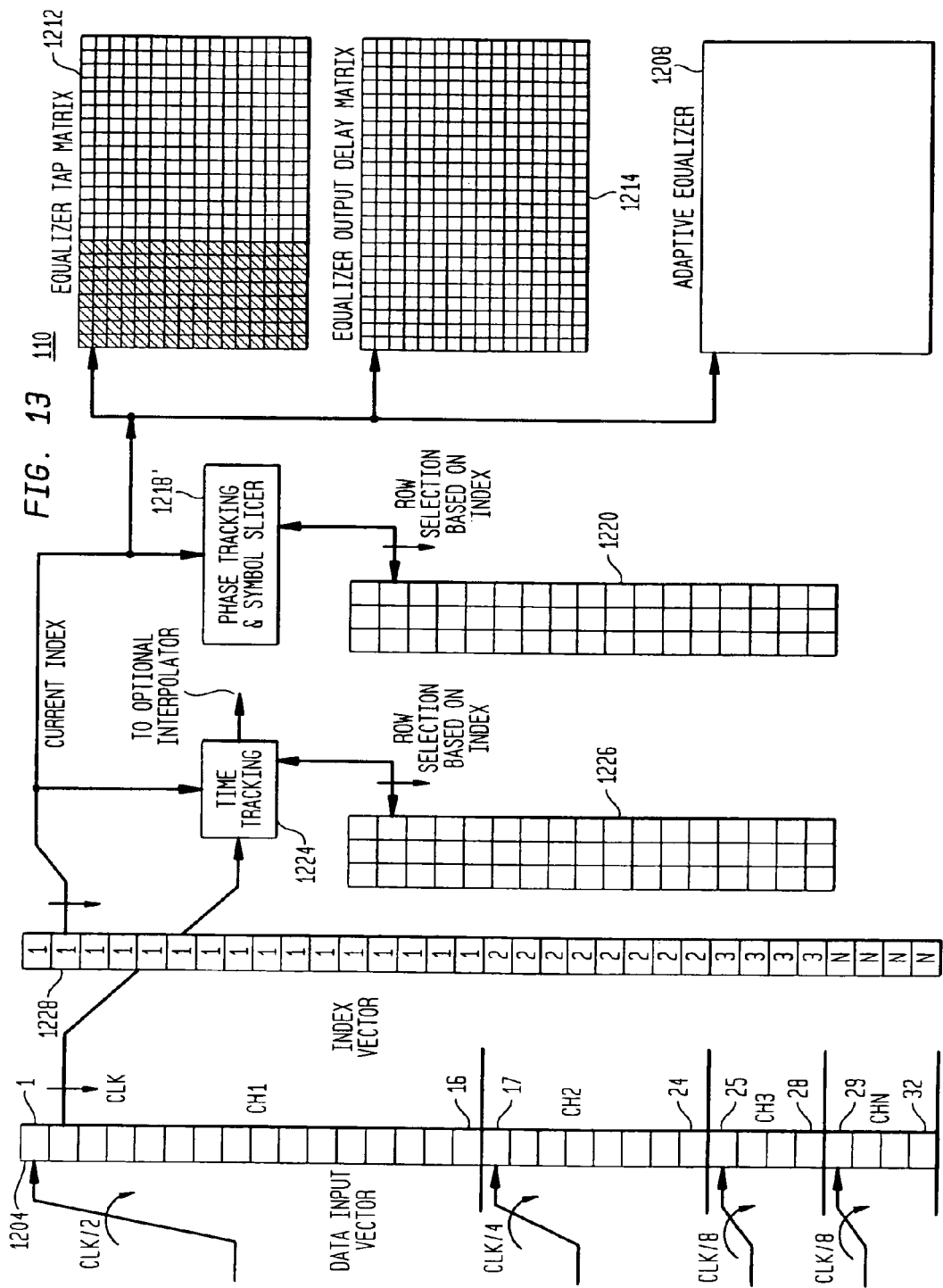
FIG. 13 is a conceptual block diagram of a receiver that may be employed in a communications system in accordance with the principles of the present invention.

The receiver front end processor 600 accepts this digitized channel information and converts each of the channels within the entire 5 to 42 MHz band to baseband, in parallel, and may be used in conjunction with a receiver 110 such as described in the discussions related to FIGS. 12 and 13 to demodulate and decimate multi-channel signals such as DOCSIS upstream signals. A single ADC, such as ADC 106 of FIG. 1 may convert the analog upstream signal to a digitized full-band data stream that is to be processed by the front end processor 600. That is, a single ADC may sample the entire 5 MHz-42 MHz band to produce a digitized data stream for processing by the front end processor 600. The entire digital data stream is fed to each of down converters 602, 604, and 606, each of which is dedicated to one of the N channels within the upstream band. Each down converter includes a multiplier that multiplies the input digital bit stream by $e^{j\omega_N n}$, where $\omega_N$ is the center frequency of a particular channel, to effect the conversion of each channels' data stream to a baseband signal, with the center frequency of the channel shifted to 0 Hz. Each multiplier value is determined at the time channels are selected, as they might be to avoid interference.

The down-converted in-phase and quadrature (I and Q) channel data is transferred from the down converters 602, 604, and 606 to the respective decimators 608, 610, and 612. Each decimator reduces the sample rate of each of the down-converted channels to at least twice the symbol rate of the corresponding channel while acting as a low-pass filter to filter out-of channel data. Decimators are known in the art and the decimators 608, 610, and 612 may be constructed of cascade-comb-integrator (CIC) and canonic signed digit (CSD) filters, for example. CIC is known in the art and discussed, for example, in a U.S. Pat. No. 4,864,526, entitled INTERPOLATOR/DECIMATOR FILTER STRUCTURE AND A DIGITAL FILTER THEREFORE, issued to Dyer, which is hereby incorporated by reference. CSD is known in the art and discussed, for example, in U.S. Pat. No. 5,262,974 entitled PROGRAMMABLE SIGNED DIGIT FILTER, issued to Hausman et. al., which is hereby incorporated by reference.

A front end processor 600 such as just described may be us@ to produce samples of the received channels where I and Q are in quadrature for use by a receiver as described in the discussion related to FIGS. 1, 12, and 13. In an integrated circuit implementation, the logic blocks that form each down converter 602, 604, and 606 are repeated, as are the logic blocks that form each of the decimation stages 608, 610, and 612. Consequently an integrated circuit layout may take advantage of this regularity through improved efficiency. Additionally, with the output sample rate of each of the channels at least twice the symbol rate of the respective channels, follow-on logic, such as discussed in the description of a receiver in relation to the discussion of FIGS. 12 and 13, may operate at a relatively slow clock rate, thereby conserving power.

In the illustrative embodiment of FIG. 7 a tree-structured front end processor 700 may be used in telecommunications applications where a broad frequency band is divided into groups of channels, hereinafter referred to as "group-channels" and the group channels may be further divided into individual channels, as illustrated in the frequency diagram of FIG. 8 where group channels GCH1, GCH2, GCH3, and GCHN are respectively divided into channels CH1, CH2, CH3; CH4; CH5, CH6, and CHN1, CHN2, CHN3, and CHN4. Each of the Group Channels occupies a predetermined frequency band within a signaling band that extends from frequencies A to B and each group channel may be divided into channels of predetermined frequency widths.

In accordance with the principles of the invention, the front end processor 700 may be configured in a tree-like topology to iteratively convert to baseband and decimate successively smaller portions of the entire band, yielding I/Q data streams representing the component channels converted to baseband signals sampled at least twice the symbol rate of each of the channels. That is, the front end processor 700 may be configured to operate on the entire band from A to B (as represented in FIG. 8) converted to a single digital bit stream, such as may be accomplished by a single ADC sampling at a rate of at least twice the highest frequency, B, in the band.

In a first step, the front end processor may "shift the frequency of the sampled data stream representing the entire band (such as the band A to B of FIG. 9A) to baseband, as illustrated in the frequency diagram of FIG. 9B, where the mid frequency, E, of the middle frequency band (from C to D) is now at 0 Hz. Subsequent shifts represented in the frequency diagrams of FIGS. 9B through 9D bring the D to B band and the A to C band to baseband. As will be described in greater detail in the discussion related to FIG. 7, such shifts in combination with decimation filter stages produce an output data stream in which all the constituent channels emerge from the successive shifts to baseband and decimations.

Figure 7:
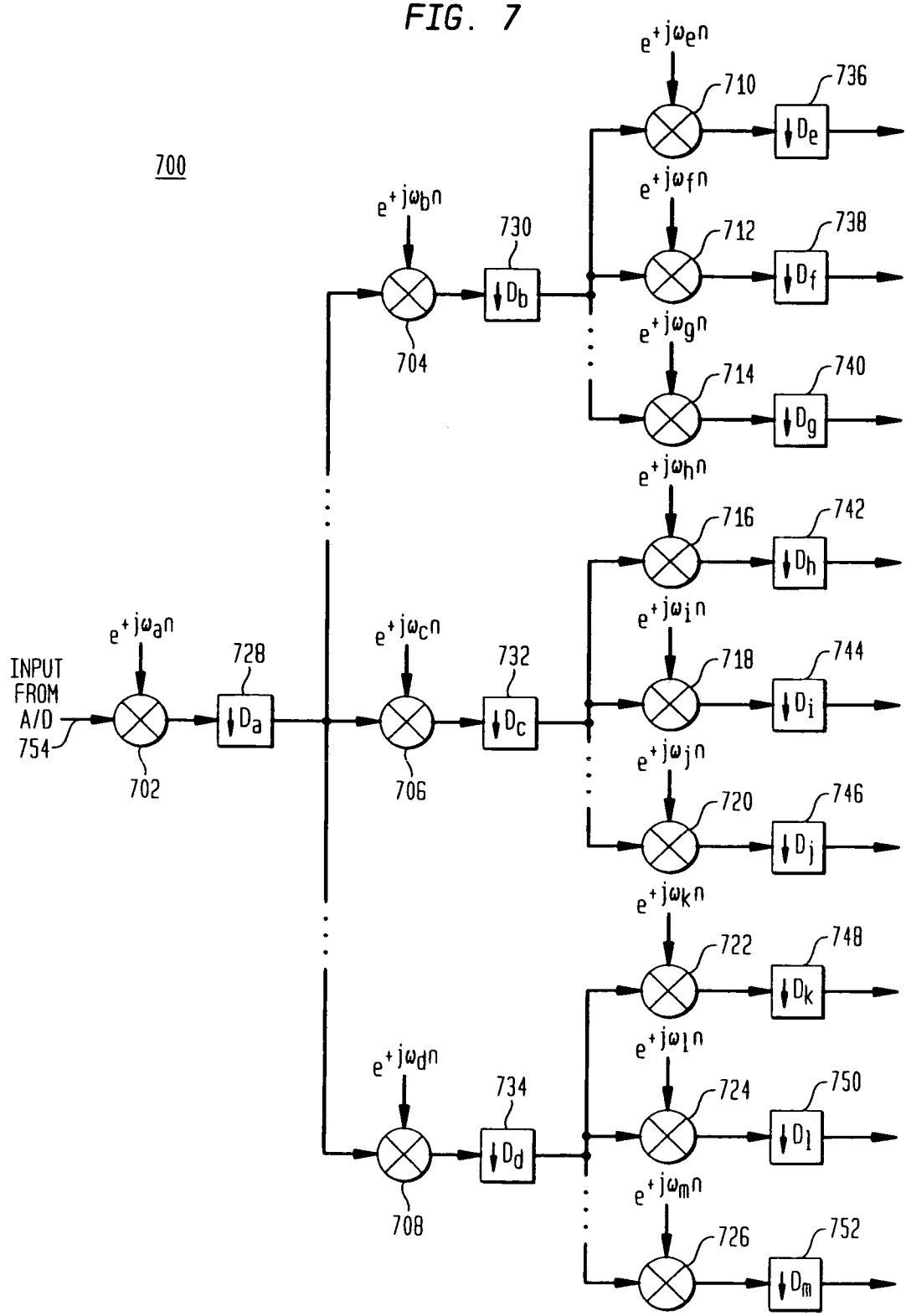
FIG. 7 is a conceptual block diagram of another embodiment of a front end processor that may be used in a communications system in accordance with the principles of the present invention.

Returning now to the conceptual block diagram of FIG. 7, the font end processor 700 is characterized by a tree structure in which down conversion stages 702 through 726 are respectively followed by decimation stages 728 through 752. The front end processor 700, which may also be referred to as a tree down converter decimator (TDD) 700 for convenience, digitally down-converts the N passband digital communication channels that compose a communications band, such as the band represented by the frequency band A to B of FIG. 8, the signals sampled as a group at one sample rate into N independent I/Q baseband channels each sampled at least twice the symbol rate of the individual channels.

At the digital input 754 the TDD 700 accepts a digital input stream of real data sampled at twice the frequency of the highest frequency of the group channel which comprises the N channels being down-converted and decimated. Unlike the front end processor described in the discussion related to FIG. 6, which operates on signals having channels assigned with a great deal of flexibility, it is assumed in this illustrative embodiment that each of the channels operates at a predetermined, fixed carrier frequency. Such a system might be particularly advantageous in a distributed hybrid fiber cable system, such as described in the discussion related to FIG. 4, since, in such a system the number of subscribers (substantially less than one thousand) contributing noise and interference to a particular cable link is drastically reduced in comparison to the number of subscribers (as many as twenty thousand) contributing noise and interference through cables to a conventional headend and, consequently, the motivation for flexibility in selecting upstream channels that avoid interference is greatly reduced. Such a fixed carrier frequency assignment system is compatible with the DOCSIS standard. Each of the down-converters 702 through 726 multiplies the signal that it has received by a center frequency that, as illustrated in the frequency diagrams of FIGS. 9A to 9D shifts the segment of interest to baseband (that is, centers it at 0 Hz). The subsequent decimation filters act as low pass filters to remove signals not of interest at a particular point in the TDD tree.

For example, if the signal that emerges from decimation filter 728 includes three group channels, and the center group channel has a center frequency equal to $-\omega_a$, of 702, then only two follow-on decimation filters would actually be employed in the next tier of down-converters (704, 706, 708) and filters (730, 732, 734) with one down-converter dedicated to bring an upper group-channel to baseband, another dedicated to bring a lower group-channel to baseband and the center group channel, already brought to baseband by the down-converter 702, would merely be filtered to exclude the contributions from the upper and lower group channels. The decimation filter following the down-conversion of the upper group channel filters contributions from the middle and lower group channel, and the decimation filter following the down-conversion of the lower group channel filters the contribution from the middle and upper group channels. The equivalent passband frequency at each down-converter equals the sum of all down-converter frequencies up to and including the downconverter of interest. That is, if the multiplication frequency of down converter 702 is $\omega_a$ and the multiplication frequency of down converter 704 is $\omega_b$, the equivalent passband frequency of downconverter 704 is $(\omega_a+\omega_b)$. If the ratio of the sample rate entering a given downconverter m divided by its downconversion frequency $\omega_m$ is an integer, then the downconverter may be constructed using a multiplier-less circuit containing a multi-position switch and CSD circuits. CSD circuits may be used to produce the decimation filters 728 through 752 and down-converters 702 through 726, thereby eliminating the need for costly multipliers.

Figure 10:
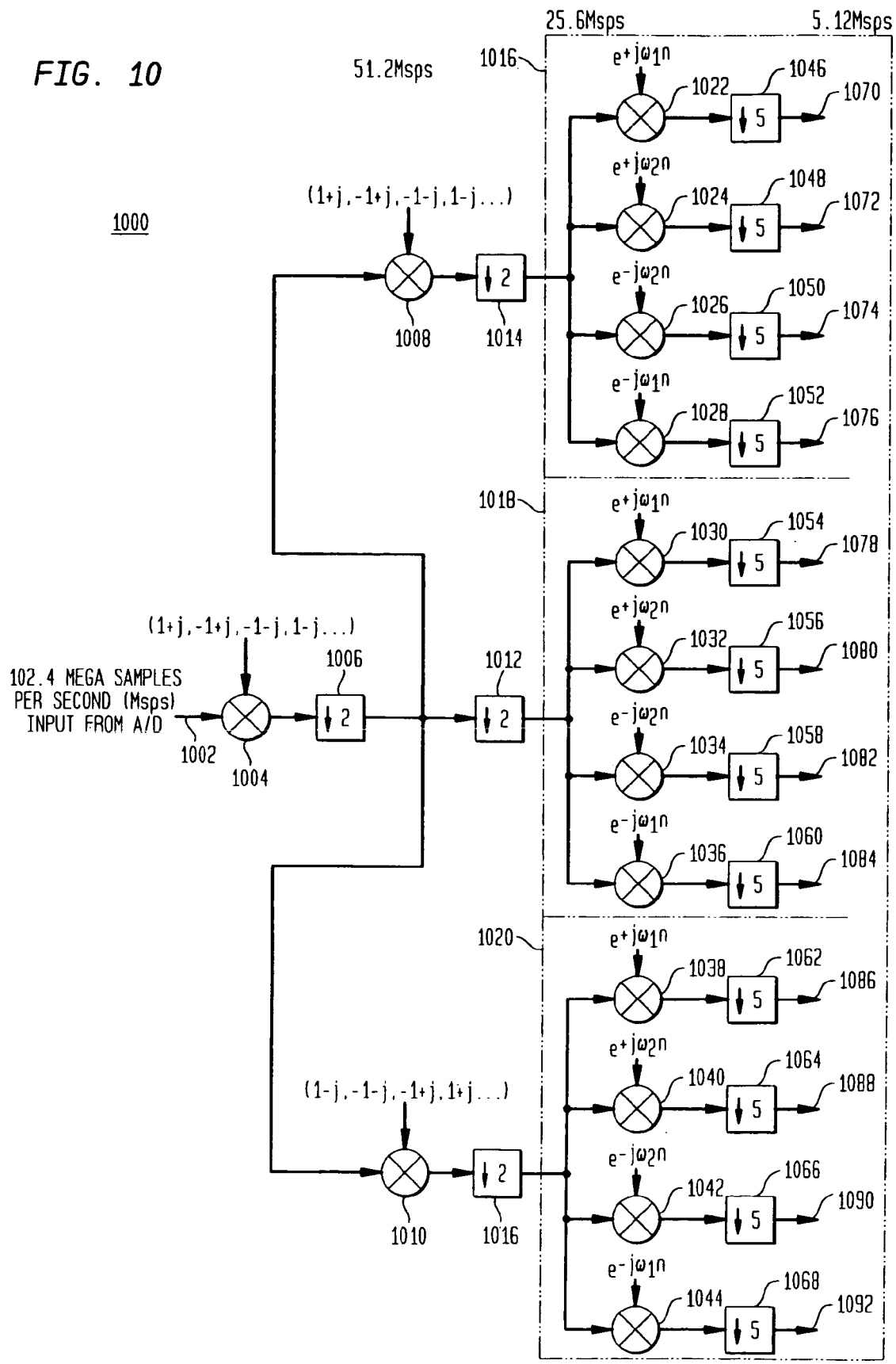
FIG. 10 is a conceptual block diagram of a front end processor that may be used in a communications system in accordance with the principles of the present invention.

Turning now to the conceptual block diagram of FIG. 10, which is a specific, illustrative embodiment of the TDD of FIG. 7 In this illustrative embodiment, an iterative TDD front end processor 1000 is configured to process signals in a band from 6.4 MHz to 44.8 MHz, having non-overlapping channels of a bandwidths of approximately 3.2 MHz, 1.6 MHz, 0.8 MHz, 0.4 MHz, or 0.2 MHz. The channels are organized into 3.2 MHz wide group channels that have center frequencies at 4.8+3.2(N) MHz (where N=1, 2, 3 ... 11). Such a front end processor is particularly useful in a DOCSIS-like system that may be employed in conjunction with distributed mini-headends such as described in the discussion related to FIG. 4.

In this illustrative embodiment, the TDD 1000 digitally down-converts the twelve group channels aligned side by side from a lower band edge of 6.4 MHz to an upper band edge of 44.8 MHz and then decimates them to $\frac{1}{20}^{th}$ of the input sample rate. Employing a TDD 1000 such as this permits the entire multi-channel upstream band (similar to a DOCSIS upstream band, but including the frequency restrictions just described) to be immediately reduced to a lower sample rate and to thereby ease follow-on processing. Although multiplier functional elements are displayed in the block diagram of FIG. 10, as previously discussed, the multiplication (and decimations) may be accomplished using shifts and additions in CSD techniques, thereby eliminating integrated circuit multipliers that are complex and that consume considerable circuit area and power. The logic blocks of the TDD 1000 are regular and repeated and, consequently, particularly suited for implementation in very large scale integrated (VLSI) circuits.

At the data input 1002 the TDD 1000 accepts digitized I and Q data from a 6.4 MHz lower band to 44.8 MHz upper band sampled at a rate of 102.4 mega-samples per second. The downconversion frequency of downconverter 1004 being 102.4 Mhz÷4 may be implemented using a four position switch to select one of (1+j, 1−j, −1−j, 1−j, . . . ) each sample period to down-convert the entire 6.4 MHz to 44-8 MHz band to baseband in a manner such as described in the discussion related to FIG. 7. The resulting baseband signal is decimated by two in the decimator 1006 to yield a 51.2 mega-sample per second I and Q data stream that is passed to downconverters 1008 and 1010 and a 2:1 decimation filter 1012. The downconverters 1008 and 1010 respectively convert the upper and lower thirds of the 38.4 MHz band centered at 0 Hz to baseband, using downconversion frequencies of ±51.2 Mhz÷4. The middle third of the baseband signal, which, is already at baseband is simply filtered by the 2:1 decimation filter 1006. The baseband signals from downconverters 1008 and 1010 and decimation filter 1006 are respectively filtered by 2:1 decimation filters 1014, 1016 and 1012. The 25.6 mega-sample par second data streams from the decimation filters 1012, 1014, and 1016 are respectively transferred to final stages 1016, 1018, and 1020. Each of the final stages 1016, 1018, and 1020 includes four downconverters 1022-1028, 1030-1036, 1038-1044, and four 5:1 decimation filters 1046-1052, 1054-1060, and 1062-1068, that, by shifting and decimating as described in the discussion related to FIG. 7, convert each of the constituent group channels to baseband signals sampled at 5.12 mega-samples per second.

The data stream sent to the final stages 1016, 1018, and 1020, respectively represent the upper, middle, and lower thirds of the original 38.4 MHz band and the final stages 1016, 1018, and 1020, employ the respective downconverters (which, again, may be implemented using the shift and add of CSD techniques) to convert each of the three 12.8 MHz wide bands into four 3.2 MHz baseband group channels. The 5:1 decimation filters, in addition to filtering out-of band information, reduce the data rate of each of the baseband I and Q data streams emerging from the data outputs 1070-1092 to 5.12 mega-samples per second.

Since each of the group channels may comprise a variety of channels having various frequency allotments, the data streams emerging from data outputs 1070-1092 may require varying degrees of further demodulation in order to obtain baseband signals sampled at twice a channel's symbol rate. For example, a single channel may be co-extensive in frequency with a group channel (that is, may occupy 3.2 MHz) and, therefore, no further demodulation may be required, while other group channels may comprise various mixes of 1.6 MHz, 0.8 MHz, 0.4 MHz, or 0.2 MHz channels. Further, flexible, demodulation steps may be performed by follow-on stages as illustrated in the conceptual block diagram of FIG. 11, with one stage dedicated to processing each of the twelve data streams from outputs 1070-1092 of the TDD 1000. The follow-on stage 1100 may be used in conjunction with a front end processor such as that described in the discussion related to FIG. 10 to produce baseband channel signals sampled at least twice the symbol rate of each of the channels.

Similar to the front end processor 1000, the follow-on stage 1100 includes an array of multiplication 1102-1112 and decimation 1114-1124 stages whose functions are, as described in the discussion related to FIG. 1000, to shift channels to baseband and to filter the shifted channels to thereby yield signals of interest. However, since the follow-on stage 1100 is not operating on the entire upstream band, but, rather, on individual group channels, the follow on stage 1100 includes "bypass" data paths 1126-1138 for those channels that have been fully downconverted and decimated. For example, if the follow on stage 1100 is operating on group channel data for which there is a single, 3.2 MHz channel, the bypass path 1126 would be employed to pass data through to a receiver 110, such as described in the discussion related to FIG. 1 and will be described in greater detail in the discussion related to FIGS. 12 and 13. Similar paths are provided at each stage of the follow-on processor 1100 which includes a sufficient number of such stages to reduce all the data to channel specific baseband data. For example, in this illustrative embodiment, four stages (not all shown) would be required, one to process 3.2 MHz group channel to two 1.6 MHz groupings, a second stage to process the 1.6 MHz groupings to combinations that might include 1.6 MHz and 0.8 MHz channels, a third stage to process 0.8 MHz groupings to combinations that might include 0.8 MHz and 0.4 MHz channels and a fourth stage to process 0.4 MHz groupings that might include 0.4 MHz and 0.2 MHz channels.

Figure 11:
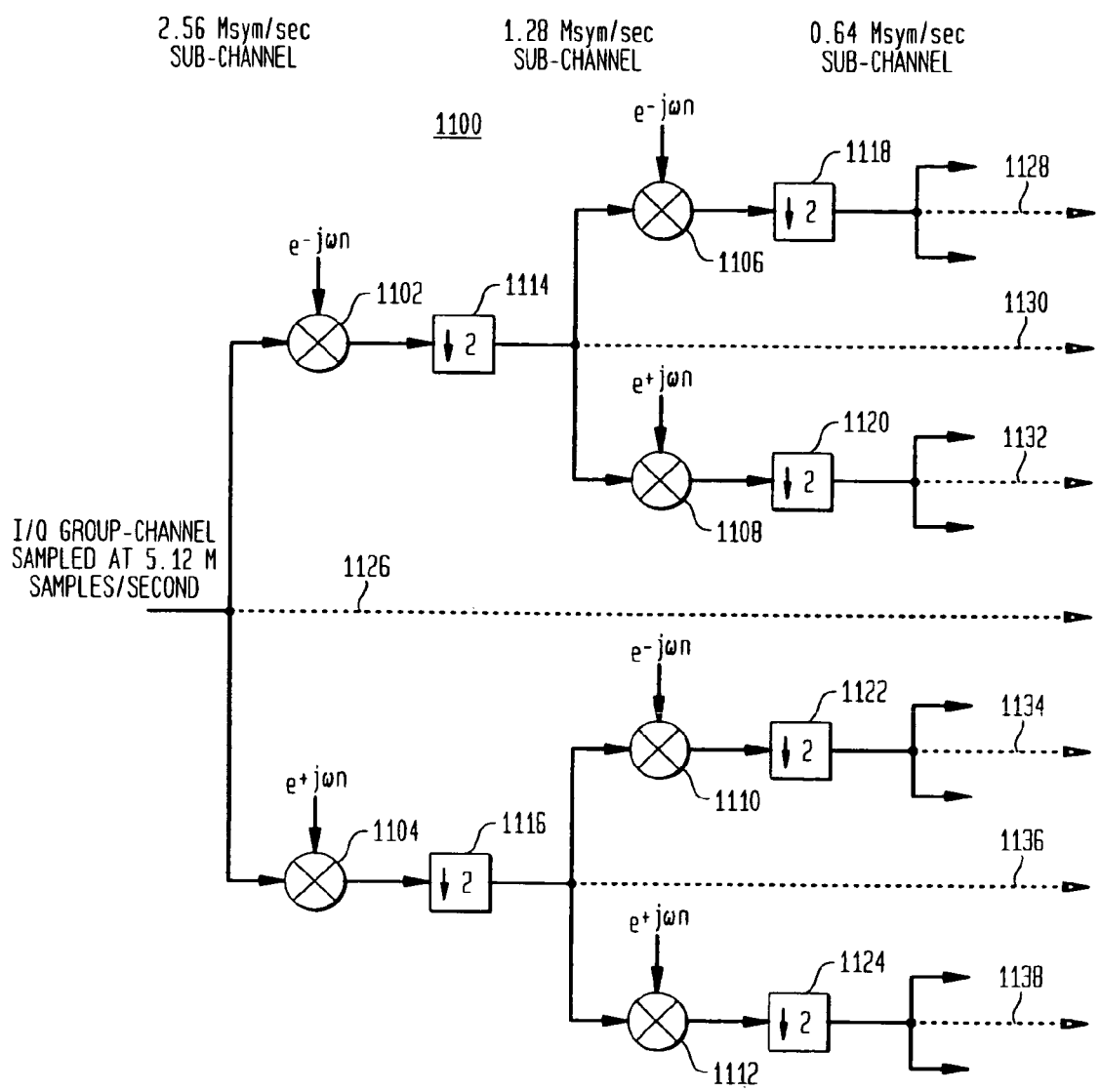
FIG. 11 is a conceptual block diagram of a front end processor that may be used in a communications system in accordance with the principles of the present invention.

Just as the front end processor 700 described in relation to the discussion of FIG. 7 may be used with any number and arrangement of channels distributed throughout a frequency band to produce an output data stream representative of each component channel sampled at least twice the symbol rate of each of the channels, various combinations of the TDD 1000 described in the discussion related to FIG. 10 and the follow on processor 1100 described in the discussion related to FIG. 11 may be employed to provide similar demodulation and decimation of signals in DOCSIS-like communications systems that, unlike DOCSIS, assigned fixed frequencies to frequency sub-ranges within an upstream band.

In an illustrative embodiment depicted by the conceptual block diagram of FIG. 12, a receiver 110 equalizes, provides phase and timing correction for each of the channels, cycling through the data related to each channel in sequence, thereby requiring only one the phase-correction, one timing-correction and one equalization circuit for all the channels within a multi-channel band. The receiver 110 may be particularly useful in operation with a front end processor such as described in the discussions related to FIGS. 1, 5, 6, 7, 10, and 11, for example. That is, the receiver 110 accepts the multiple channels of a multi-channel band that have each been downconverted to baseband and are sampled at least twice the symbol rate of the respective channel and equalizes, and phase- and timing-corrects for the respective signals. The receiver 110 may operate at a constant clock rate, while processing a mix of channels, a higher number of narrow channels, or a lower number of wide channels or a combination of both.

The receiver 110 includes data memory 1204 for storage of input complex (in-phase and quadrature, or I and Q) data sampled at least twice each channel's respective symbol rate. In an illustrative embodiment the data memory 1204 is organized as a circular buffer, so that, as data are read out of a location and used in detecting input signals, new data are written in behind the read values. The memory 1204 stores the I and Q information from all channels within a band of interest. A clock 1203 operates at twice the total symbol rate of all the channels received by the receiver and, as will be discussed in greater detail, controls the timing of the various operations within the receiver 110. The receiver 110 includes an equalizer subsystem 1206, that, in turn, includes an equalizer 1208, equalizer state storage 1210, an equalizer tap matrix 1212, and an equalizer delayline matrix 1214. The receiver 110 employs the equalizer subsystem 1206 to rid incoming signals of inter-symbol interference. Equalizers are known, and discussed, for example, in U.S. Pat. No. 4,004,226 entitled QAM RECEIVER HAVING AUTOMATIC ADAPTIVE EQUALIZER, issued to Qureshi, et. al. (Qureshi), which is hereby incorporated by reference.

A phase tracking subsystem 1216 includes a phase tracking loop (phase recovery) 1218 and phase tracking storage (phase state) 1220. Phase tracking loops are known and discussed, for example, in U.S. Pat. No. 5,796,786 entitled PHASE ERROR DETECTING METHOD AND PHASE TRACKING LOOP CIRCUIT, issued to Myeoung-hwan Lee, which is hereby incorporated by reference. A time tracking subsystem 1222 includes a time tracking loop (time recovery) 1224 and time tracking storage (time state) 1226. Time tracking loops and timing recovery circuits are known and discussed, for example, in U.S. Pat. No. 4,004,226 issued to Qureshi, and discussed above. An indexer 1228 operates to provide the time tracking phase locked loop 1224, the phase tracking phase locked loop 1218, and the equalizer 1208 with state, tap, and delayline information corresponding to the channel data being processed at a given time.

For clarity and ease of description, we will discuss the operation of the receiver 110 in terms of a DOCSIS implementation but the receiver may find application in any multi-channel communications system such as previously described. In operation I and Q data are written to data memory 1204, with data from each channel written to a separate section of data memory. For example $I_1$ $Q_1$ data are written into data memory segment 1, $I_2Q_2$ data are written into data segment 2, $I_3$ $Q_3$ data are written into data memory segment 3; with, $I_N$ and $Q_N$ data from the Nth channel written into the Nth data memory segment. Data are written into the data memory segments after older data are read out, using selector 1205, for use in one cycle, but before newer data are needed for the next cycle. This cycling may be accomplished in various ways, but, in this illustrative embodiment, the overall rate at which the data are written to the data memory (and the rate at which is written to the equalizer) is at least twice the total symbol rate of all the channels from which data are received.

As previously described, a multichannel upstream receiver that is compatible with the DOCSIS standard may employ multiple channels of varying bandwidths with values of 3.2 MHz, 1.6 MHz, 0.8 MHz, 0.4 MHz and 0.2 MHz. A receiver 110 may be configured in a DOCSIS system to be capable of processing the sum total of all baseband data from all of the allocated upstream channels. In the example of FIG. 13, four DOCSIS compatible channels, namely 1.6 MHz, 0.8 MHz, 0.4 MHz and 0.4 MHz are shown as inputs to the receiver 110. Receiver 110 is configured to process up to 1.6 MHz+0.8 MHz+0.4 MHz+0.4 MHz=3.2 MHz of total bandwidth. The same receiver configuration 110 could be used to process any combination of DOCSIS compatible baseband channels where the sum total of the bandwidths of these channels equals 3.2 MHz.

Data are read out of the data memory and provided to the equalizer 1208 at a rate, CLK, that is twice the total symbol rate of all the channels. With output data provided at the same rate as input data, data is transferred out of the data memory at a clock rate CLK that is the total of the rates of data input for each channel. If the data rate of the channel associated with the highest data rate is evenly divisible by the data rate of every other channel, the data may be arranged so that data is transferred out at the CLK rate while new data is written in at the CLK/Cr, where 1/Cr is the ratio of a particular channel's data rate to the total data rate of all channels. Additionally, the data memory allocated to a particular channel reflects the ratio of sampled data rates. For example, if the sampled data rate associated with a channel N is ½ the sampled data rate of all the channels, data may be written into data memory allocated to channel N that occupies half the data memory 1204 set aside for sampled data, at a rate CLK/2, "filling in" behind the transfer of data from channel N's allocated data memory to the equalizer and phase locked loops. In a DOCSIS-compliant communications system all channels operate at even multiples of one 16th of the total data rate of the associated group channel, and the clock rates for each of the channels reflect the above described relationship.

As data are simultaneously transferred into the data channel locations from a sampled data source and to the equalizer subsystem 1206 and correction loops 1218 and 1224 from the data channel locations in memory 1204, the indexer 1228 provides an indication to the equalizer subsystem 1206 the time tracking loop (time recovery) 1224, and the phase tracking loop (phase recovery) 1218 of the channel associated with the data being transferred from the data memory at any given time. The indexer 1228 thereby provides to the time tracking loop (time recovery) 1224 the current values of the time tracking loop state and current timing estimates, to the phase tracking loop (phase recovery) 1218 the current values of the phase tracking loop state, current equalizer output, current symbol slicer 1230 output, and current error value 1232 (which may, for example, be a least mean squared error update value), and to the equalizer 1208, current tap values, current delayline values, and current phase tracking loop state values, all associated with the current sampled data values being transferred from the data memory associated with a channel that is currently being processed.

Turning now to FIG. 13, each channel can accommodate different symbol rates and, in the illustrative example of FIG. 13 channels 1 through "N" respectively operate at 1.28, 0.64, 0.32, and 0.32 million symbols per second and the total symbol rate of all channels, that of the group channel, is 2.56 mega-symbols per second. The maximum sample rate for the sum of the channels, twice the symbol rate, is 5.12 million samples per second. In the illustrative embodiment, there are a total of thirty two data locations within the data memory 1204, with the number of data locations devoted to a channel in proportion to the channel's data rate. For example, channel one, with a data rate twice that of channel two, and four times that of channels three and N, may have sixteen data locations in data memory, with eight dedicated to channel two, and four each to channels three and N. With data written to each channel data segment at twice the respective channel's symbol rate, each channel data segment will be "filled" in the same amount of time. And, with the output clock CLK operating at twice the group channel symbol rate, data are read out of all the data locations and written to the equalizer in a manner that does not require buffering.

For example, in the illustrative circular buffer embodiment of FIG. 13, as data from location 1 is read out and written to the equalizer, data are written into the data locations "behind" the readout. Consequently, as the output data are transferred out of channel data locations 1 through 16 to the equalizer at the output clock rate, CLK, and new data are written in behind at the rate of CLK/2, new data are written into location 1 as old data are transferred from location 2, new data are written to location 2 as old data are transferred from location 4, . . . , new data are written into location 8 as old data are transferred from location 16, new data are written into location 16 as old data are transferred from location 32, and the cycle then repeats. Similarly, other channel data locations are filled at their corresponding clock rates after older data are written to the equalizer, so that, for example, data may be written into locations 1, 17, 25 and 29 at approximately the same time data are written from location 1 into the equalizer and data may be written into locations 16, 24, 28 and 32 at approximately the same time that data are written from location 32 to the equalizer.

In this illustrative embodiment, the indexer 1228 is an index vector having index values corresponding to the channel associated with data that is currently being transferred from data memory 1204 organized as a data vector. For example, with a data vector of thirty-two locations, the first sixteen of which are allocated to channel CH1, the next eight of which are allocated to channel CH2, the next four allocated to channel CH3, and the last four allocated to channel CHN, the first sixteen locations of the index vector include an indication of channel CH1, the next eight locations include an indication of channel CH2, the next four include an indication of channel CH3, and the last four include an indication of channel CHN.

As data are simultaneously transferred into the data channel locations for channels CH1 through CHN from a sampled data source at respective rates of CLK/2, CLK/4, CLK/8, and CLK/8 and to the equalizer 1208 and time tracking loop, the index vector provides an indication to the equalizer 1208 the time tracking loop 1224, and the phase tracking loop 1218' of the channel associated with the data being transferred from the data memory at any given time. As the index vector is clocked through, along with the data vector, the index vector permits the time tracking loop to select the current values of the time tracking loop state and current timing estimates by indicating the appropriate row within the time tracking loop vector 1226. Similarly, the index vector provides an indication to the phase tracking loop the current values of the phase tracking loop state, current equalizer output, current symbol slicer output, and current error value by pointing to the appropriate row within the phase tracking loop vector 1220. The index vector also provides an indication to the equalizer 1208 of current tap values, current delayline values, and current phase tracking loop state values, all associated with the current sampled data values being transferred from the data memory associated with a channel that is currently being processed by pointing to the appropriate locations within the equalizer tap matrix, the equalizer delayline matrix 1214 and phase tracking loop state vector 1220. The index vector may be filled at configuration with index values that reflect channel assignments through a one-to-one mapping with the entries of the input data vector 1204.

In operation, as data is transferred from the input data vector 1204 at the CLK rate, corresponding index values, clocked out at the same rate, step the phase tracking loop, time tracking loop, and equalizer through corresponding state and other values, as previously described. Data is transferred from the input data vector 1204 to the time tracking loop and the equalizer 1208. State information is transferred from the time tracking loop state vector to the time tracking loop, as guided by the index vector 1228. State information is updated in the time tracking loop state vector. The time tracking loop produces a current timing error value. The "equalized" data is passed from the equalizer 1208 to the phase tracking loop for phase correction and tracking. The phase tracking loop obtains state information from the phase tracking loop state vector and updates the state information. The updated state information is written back to the state vector 1220. The phase tracking loop produces a phase correction value which is used to rotate the equalizer output and thereby reduce phase error. The phase correction value is also used to de-rotate the equalizer update error. The de-rotated equalizer update error is written to an equalizer state vector.

Equalizer tap values and delayline values are updated, respectively, from the equalizer tap matrix 1212 and to the equalizer delayline matrix 1214. The equalizer tap matrix and delayline matrix are sized to accommodate the delay spread of the widest upstream channel, taking into account whether a fractionally-spaced equalizer is used. In this illustrative embodiment, we assume that the equalizer 1208 is a T/2 fractionally spaced decision feedback equalizer, with eight feedforward and sixteen feedback taps. This illustrative embodiment is sized to process a single DOCSIS group channel, and as such can receive up to sixteen 0.2 MHz baseband channels, therefore the equalizer matrices and the phase and timing state vectors are sixteen rows deep, one row for each channel. Coefficients from a row of the tap matrix, as indicated by the index vector, are fed to the equalizer taps. Input data from the input data vector 1204 and a corresponding hard decision value from the phase tracking state vector 1220 are respectively applied to the equalizer's feedforward delayline and feedback delayline. The equalizer multiplies the feedforward and feedback delaylines by the appropriate set of taps. The equalizer sums the results of these multiplications and the resulting preliminary symbol value is used by the phase tracking circuit to determine a phase correction for the next time cycle. A symbol slicer within the phase tracking circuit 1218' determines the nearest valid symbol to the preliminary symbol value and this value is used to update the phase tracking state vector hard decision value. Since four multiplies are required for each complex tap, the equalizer is clocked at four times the symbol rate and a single multiplier is used for each tap. The least mean squared error is updated and the tap values are written back to the tap matrix. Forward error correction (not shown) may similarly employ the index vector and state vectors for descrambler and Reed-Solomon decoder algorithms. The slicer output, stored in the phase tracking loop state vector, is mapped to bits, which are then fed to a descrambler.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A receiver system for processing a frequency modulated signal, the receiver system comprising:
   a preprocessor for preprocessing the frequency modulated signal and generating multiple channel signals acquired from the frequency modulated signal;
   a receiver containing an indexer, the receiver receiving the multiple channel signals and processing each channel signal in a sequence controlled by the indexer to phase correct, time correct, and equalize each channel signal; and
   an input circuit for storing data from each channel signal in channel specific storage areas that are synchronized for access with operations of the indexer.

2. The receiver system of claim 1 wherein the preprocessor comprises:
   at least one analog to digital converter (ADC) which operates to sample the frequency modulated signal at a rate of at least twice the highest frequency channel within the frequency modulated signal and to produce a sampled multi-channel signal; and
   a front end processor which operates to demodulate and filter the sampled multi-channel signal into multiple channel signals.

3. The receiver system of claim 2 wherein the front end processor comprises:
   demodulators for reducing the sampled multi-channel signal to multiple baseband channel data;
   filters acting on the multiple baseband channel data to decimate channel data associated with each of the channel signals; and
   a circular buffer storage for storing and reading the channel data in synchronism with the indexer.

4. The receiver system of claim 1 wherein at least two receiver systems are configured in at least two mini-headends each processing a frequency modulated signal wherein each mini-headend interfaces with a headend receiver system and communicates data obtained from the processing of the frequency modulated signal with the headend receiver system.

5. The receiver system of claim 1 wherein the receiver further comprises:
   an equalizer circuit configured to equalize each channel signal;
   a timing recovery circuit configured to recover timing information for each channel signal; and
   a phase recovery circuit configured to recover phase information for each channel signal, wherein the indexer controls the sequencing of each channel signal through the equalizer, the timing recovery, and phase recovery circuits.

6. The receiver system of claim 5 wherein the equalizer circuit comprises:
   a tap matrix storing at least one equalizer tap value in a channel specific location;
   a delay-line matrix storing at least one delay-line value in a channel specific location; and
   an equalizer receiving the at least one equalizer tap value and the at least one delay-line value from an appropriate channel specific location in the tap matrix and the delay-line matrix, wherein the appropriate channel specific location is indicated by the indexer to be associated with the channel signal being processed by the equalizer.

7. The receiver system of claim 6 wherein the equalizer circuit further comprises an equalizer state storage storing at least one equalizer state value in a channel specific location that is selected as indicated by the indexer to be associated with the channel signal being processed by the equalizer.

8. The receiver system of claim 5 wherein the equalizer circuit is a decision feedback equalizer.

9. The receiver system of claim 5 wherein the timing recovery circuit comprises:
   a time tracking storage storing at least one time tracking loop state value and at least one timing estimate in a channel specific location; and
   a time tracking loop receiving the at least one time tracking loop state value and the at least one timing estimate from an appropriate channel specific location in the time tracking storage, wherein the appropriate channel specific location is indicated by the indexer to be associated with the channel signal being processed by the time tracking loop.

10. The receiver system of claim 5 wherein the phase recovery circuit comprises:
    a phase tracking storage storing at least one phase tracking loop state value in a channel specific location; and
    a phase tracking loop receiving the at least one phase tracking loop state value from an appropriate channel specific location in the phase tracking storage and a current equalizer output, wherein the appropriate channel specific location is indicated by the indexer to be associated with the channel signal being processed by the phase tracking loop and the equalizer.

11. A method of providing communications in a receiver system, the method comprising:
    preprocessing a frequency modulated signal to generate multiple channel signals acquired from the frequency modulated signal;

processing the multiple channel signals in a receiver containing an indexer in a sequence controlled by the indexer to phase correct, time correct, and equalize each channel signal; and storing data from each channel signal in an input circuit in channel specific storage areas that are synchronized for access with operations of the indexer.

12. The method of claim 11 wherein the step of preprocessing further comprises:

sampling a multi-channel signal in at least one analog to digital converter (ADC) at a rate of at least twice the highest frequency channel within the multi-channel signal and outputting a sampled multi-channel signal.

13. The method of claim 12 wherein the step of preprocessing further comprises:

processing the sampled multi-channel signal by demodulation and filtering in a front end processor to output multiple channel signals.

14. The method of claim 11 further comprises:

configuring at least two receiver systems in at least two mini-headends;

processing a frequency modulated signal in each mini-headend;

interfacing each mini-headend with a headend receiver system; and communicating data obtained from the frequency modulated signal processing between each mini-headend and the headend receiver system.

15. The method of claim 11 wherein the processing step further comprises:

equalizing each channel signal;

recovering timing information from each channel signal; and recovering phase information from each channel signal, wherein the steps of equalizing, time recovering, and phase recovering are controlled by the indexer.

16. The method of claim 15 wherein the step of equalizing further comprises:

accessing at least one tap value from an appropriate channel specific location in a tap matrix; and accessing at least one delay-line value from the appropriate channel specific location in a delay-line matrix, wherein the appropriate channel specific location is indicated by the indexer to be associated with the channel signal being processed by the equalizer.

17. The method of claim 15 wherein the step of time recovering further comprises:

storing at least one time tracking loop state value and at least one timing estimate in a channel specific location in a time tracking storage;

accessing the at least one time tracking loop state value and the at least one timing estimate from the appropriate channel specific location in the time tracking storage, wherein the appropriate channel specific location is indicated by the indexer to be associated with the channel signal being processed by the time tracking loop.

18. The method of claim 15 wherein the step of phase recovering further comprises:

storing at least one phase tracking loop state value in a channel specific location in a phase tracking storage; and accessing the at least one phase tracking loop state value from the appropriate channel specific location in the phase tracking storage, wherein the appropriate channel specific location is indicated by the indexer to be associated with the channel signal being processed by the phase tracking loop.

19. A receiver system for processing a frequency modulated signal, the receiver system comprising:

a preprocessor for preprocessing the frequency modulated signal and generating multiple channel signals acquired from the frequency modulated signal;

a receiver containing an indexer, the receiver receiving the multiple channel signals and processing each channel signal in a sequence controlled by the indexer to phase correct, time correct, and equalize each channel signal; and a data memory for storing data from each channel signal in channel specific storage areas, the indexer having index values corresponding to the channel specific storage areas for controlling the sequence of processing each channel signal.

20. The receiver system of claim 19 wherein the channel specific storage areas are allocated to each channel signal in proportion to a corresponding channel's data rate.

* * * * *